(12) United States Patent
Karakotsios et al.

(10) Patent No.: US 9,075,514 B1
(45) Date of Patent: Jul. 7, 2015

(54) INTERFACE SELECTION ELEMENT DISPLAY

(71) Applicant: Amazon Technologies, Inc., Reno, NV (US)

(72) Inventors: Kenneth Mark Karakotsios, San Jose, CA (US); Nicholas Ryan Gilmour, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 159 days.

(21) Appl. No.: 13/714,115

(22) Filed: Dec. 13, 2012

(51) Int. Cl.
*G06F 3/0484* (2013.01)
*G06F 3/042* (2006.01)
*G06F 3/0481* (2013.01)

(52) U.S. Cl.
CPC .......... *G06F 3/04842* (2013.01); *G06F 3/0425* (2013.01); *G06F 3/04812* (2013.01)

(58) Field of Classification Search
CPC ....... G06F 3/017; G06F 3/016; G06F 3/0481; G06F 3/04842; G06F 3/0488; G06F 3/0482; G06F 3/033
See application file for complete search history.

(56) References Cited

U.S. PATENT DOCUMENTS

| 2006/0161871 | A1* | 7/2006 | Hotelling et al. | 715/863 |
| 2008/0005703 | A1* | 1/2008 | Radivojevic et al. | 715/863 |
| 2008/0278450 | A1* | 11/2008 | Lashina | 345/173 |
| 2009/0289914 | A1* | 11/2009 | Cho | 345/173 |
| 2010/0125816 | A1* | 5/2010 | Bezos | 715/863 |
| 2010/0214244 | A1* | 8/2010 | Kim | 345/173 |

* cited by examiner

*Primary Examiner* — Boris Pesin
*Assistant Examiner* — Mandrita Brahmachari
(74) *Attorney, Agent, or Firm* — Novak Druce Connolly Bove + Quigg LLP

(57) ABSTRACT

A finger of a user detected within a predetermined range from a surface of a display screen can be used to navigate through and select content in accordance with various embodiments. In response to detecting the finger within the predetermined range, a selection element can be positioned offset from the finger. The offset positioning keeps the selection element from being obscured by the finger and, thus, enabling it to remain visible to the user. In response to detecting the user's finger approaching the surface of the display screen, the selection element becomes fixed in its current location when the finger reaches a threshold distance from the surface. Accordingly, as the finger gets closer to the surface, it starts to converge with the selection element. Finally, the finger converges with the selection element when the finger reaches the surface of the display screen to select the desired content.

20 Claims, 6 Drawing Sheets

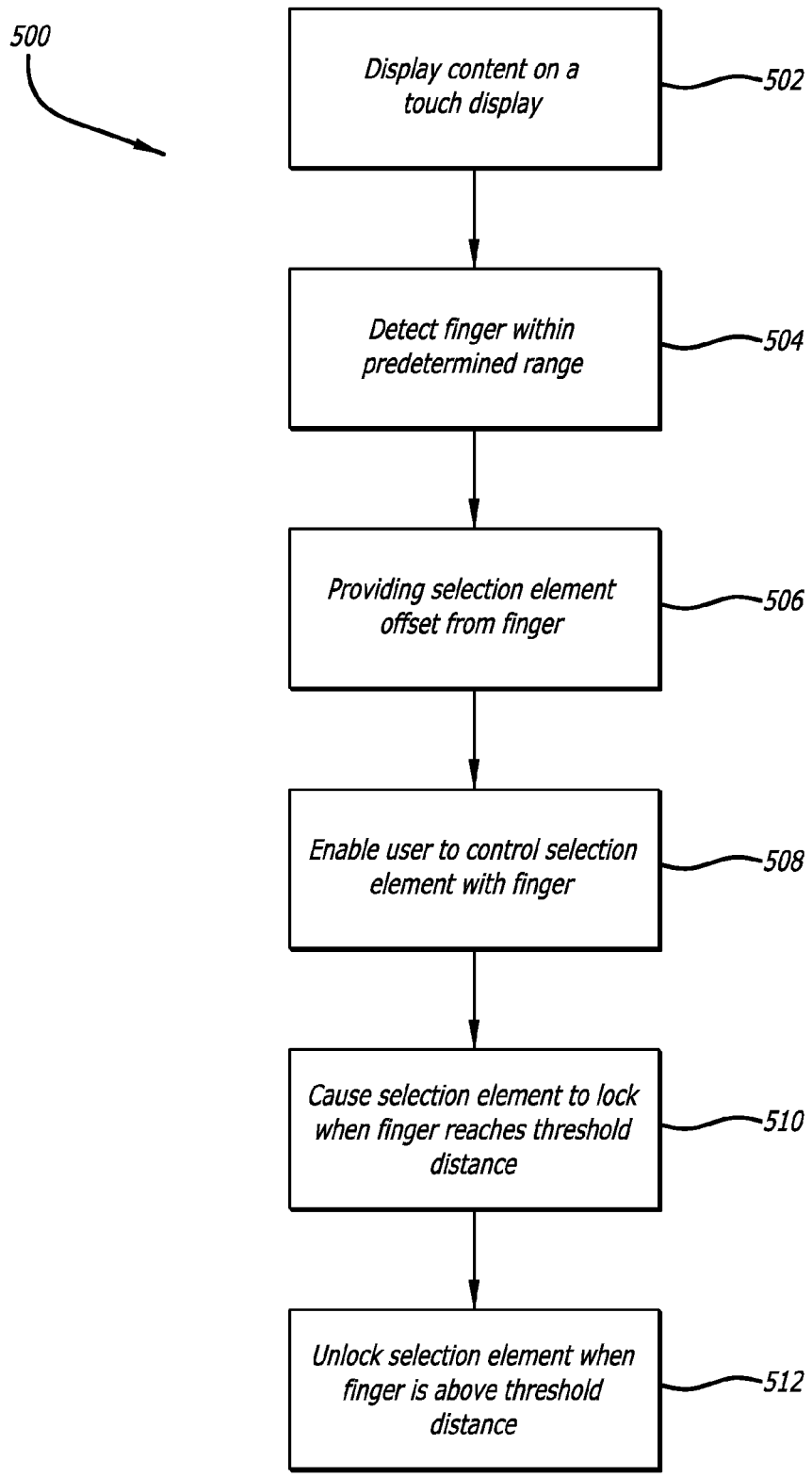

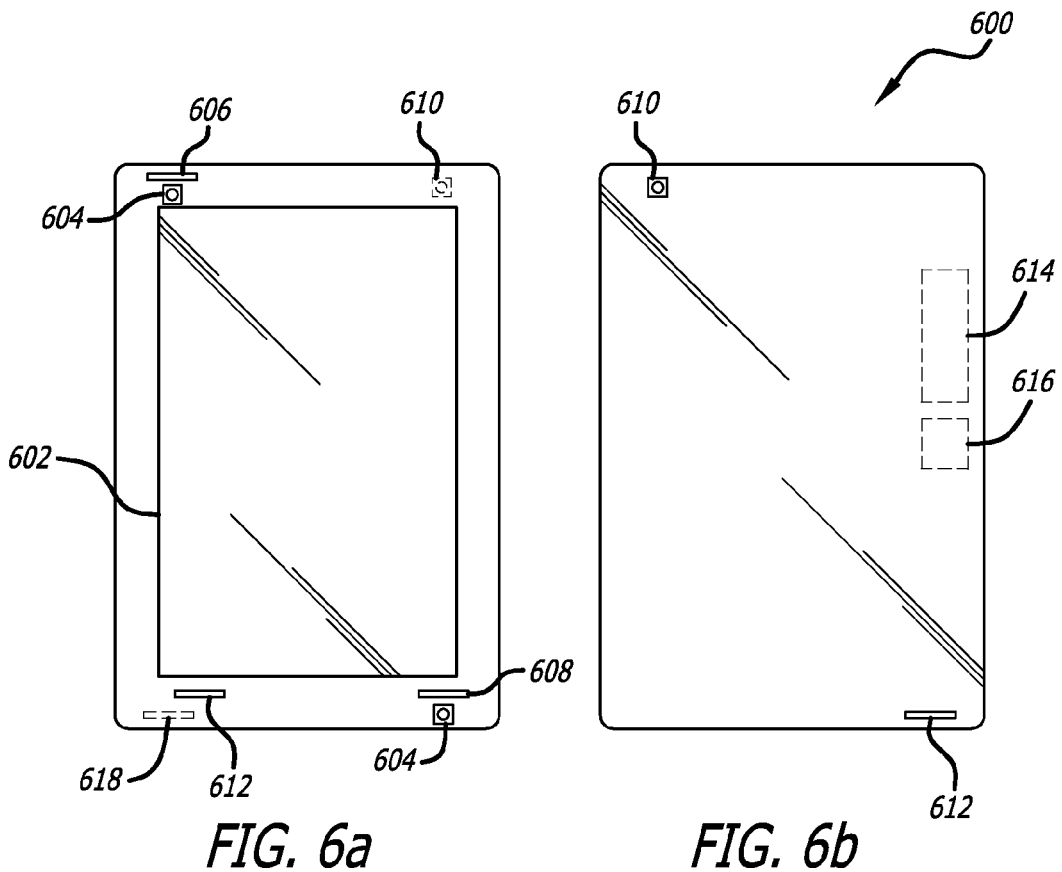
FIG. 6a
FIG. 6b
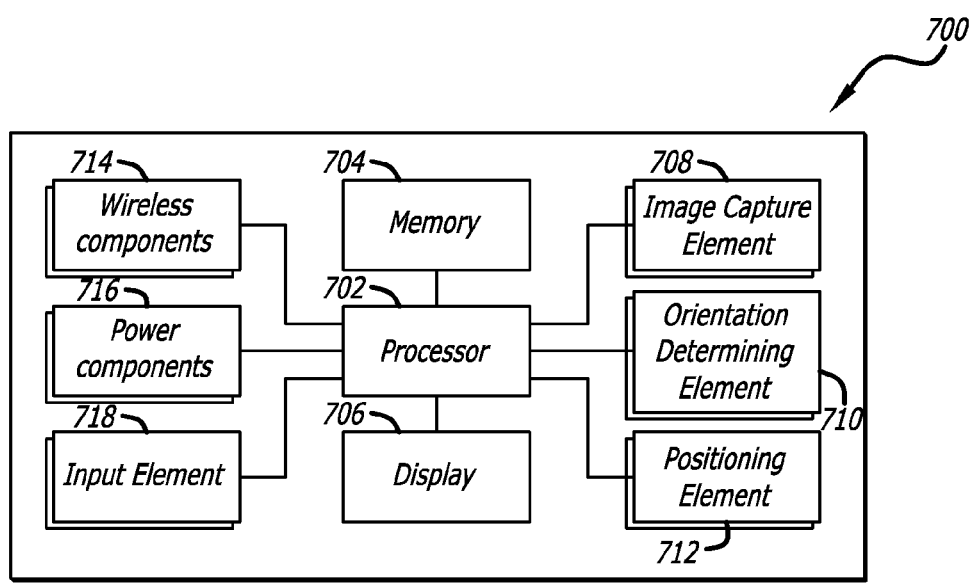
FIG. 7

INTERFACE SELECTION ELEMENT DISPLAY

BACKGROUND

People are increasingly relying on computing devices, such as tablets and smart phones, which utilize touch sensitive displays. These displays enable users to enter text, select displayed items, or otherwise interact with the device by touching and performing various actions with respect to the display screen, as opposed to other conventional input methods. In many cases, performing such a task involves a user navigating to an interface element associated with an application, locating the option to perform the task, and then selecting that option. These devices typically have relatively small touch screens to be used for providing input and, due to the limited real estate of the interfaces of such devices, the elements displayed can be quite small, making the accuracy of touch selections difficult, especially for users with thick fingers. As technology advances and as people are increasingly using portable computing devices in a wider variety of ways, it can be advantageous to adapt the ways in which people interact with these devices.

BRIEF DESCRIPTION OF THE DRAWINGS

Various embodiments in accordance with the present disclosure will be described with reference to the drawings, in which:

FIG. 5 illustrates an example process for providing input to a computing device that can be used in accordance with at least one embodiment;

FIGS. 6A and 6B illustrate an example computing device that can be used to implement aspects of various embodiments;

FIG. 7 illustrates example components that can be used with a device such as that illustrated in FIGS. 6A and 6B.

DETAILED DESCRIPTION

Figure 1A:
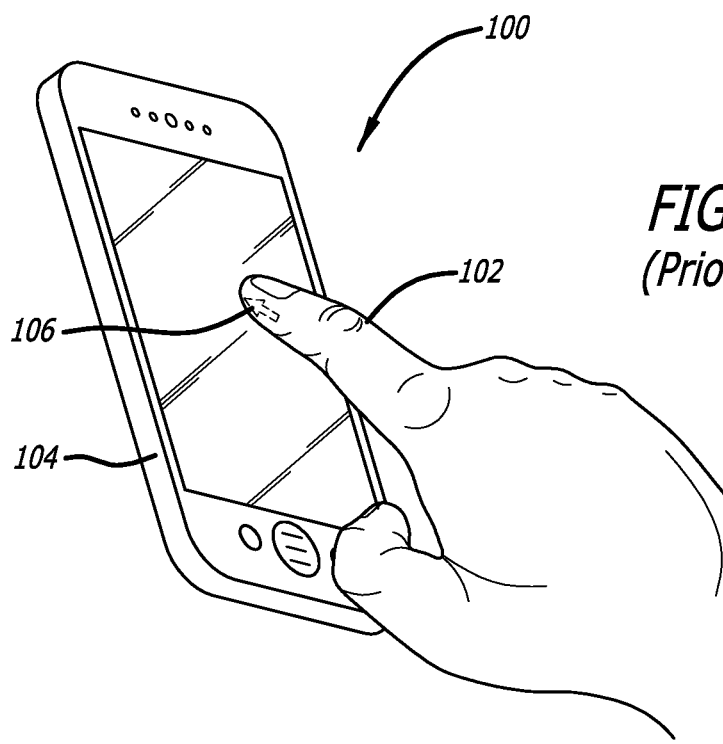
FIGS. 1A and 1B illustrate an example conventional approach for providing input to a computing device.

Systems and methods in accordance with various embodiments of the present disclosure may overcome one or more of the aforementioned and other deficiencies experienced in conventional approaches to enabling a user to interact with a computing device. In particular, various approaches enable a user to utilize a finger, or other object, to interact with an interface on a computing device. In at least some embodiments, a user can hold a device such as a phone in a first hand, and can use a fingertip of the other hand to move and control a selection element, such as a virtual or graphical cursor, pointer, item highlight, or other visual selection identifier, for example. The finger can be at least a distance from the device, such as hovering above the display, and can be imaged or tracked using one or more cameras or other sensor(s) of the device, such as an electro-magnetic field (EMF) sensor or a capacitive sensor.

A finger of a user detected within a predetermined range or distance from a surface of a display screen can be used to navigate through and select content in accordance with various embodiments. In response to detecting the finger within the predetermined range, a selection element can be positioned offset from the finger. The offset positioning keeps the selection element from being obscured by the finger and, thus, enabling it to remain visible to the user. Accordingly, the user can move their finger above the display element (while the finger is above the surface of the screen) to control movement of the selection element across the display screen with lateral movement of the finger within the predetermined range.

In at least one embodiment, in response to detecting the user's finger approaching the surface of the display screen, the selection element becomes fixed in its current location when the finger reaches a threshold distance from the surface. Accordingly, as the finger gets closer to the surface, it starts to converge with the location of the selection element. Finally, the finger converges with the selection element when the finger reaches the surface of the display screen in order to select the desired content. Further, when the user's finger is detected above the threshold distance either after or without a selection, the selection element becomes unfixed to once again enable control thereof by the user.

Further, in at least one embodiment, the computing device can track the relative position of a user with respect to the device in order to render the selection element on the display screen based at least in part upon a current point of view or perspective of the user. For example, one or more cameras can be used to track the relative head position of a user in order to assist in generating a perspective-appropriate selection element on the display screen of the device. In one example, as the device is tilted away from the user, the selection element can be rendered farther away from the finger compared to if the user was looking straight at the display so that the selection element isn't obscured by the user's finger at that angle. Further, the selection element can be rendered off to a side of the finger and the side the selection element is rendered off of can change depending on which hand the user is holding the device.

Various other functions and advantages are described and suggested below as may be provided in accordance with the various embodiments.

Figure 1B:
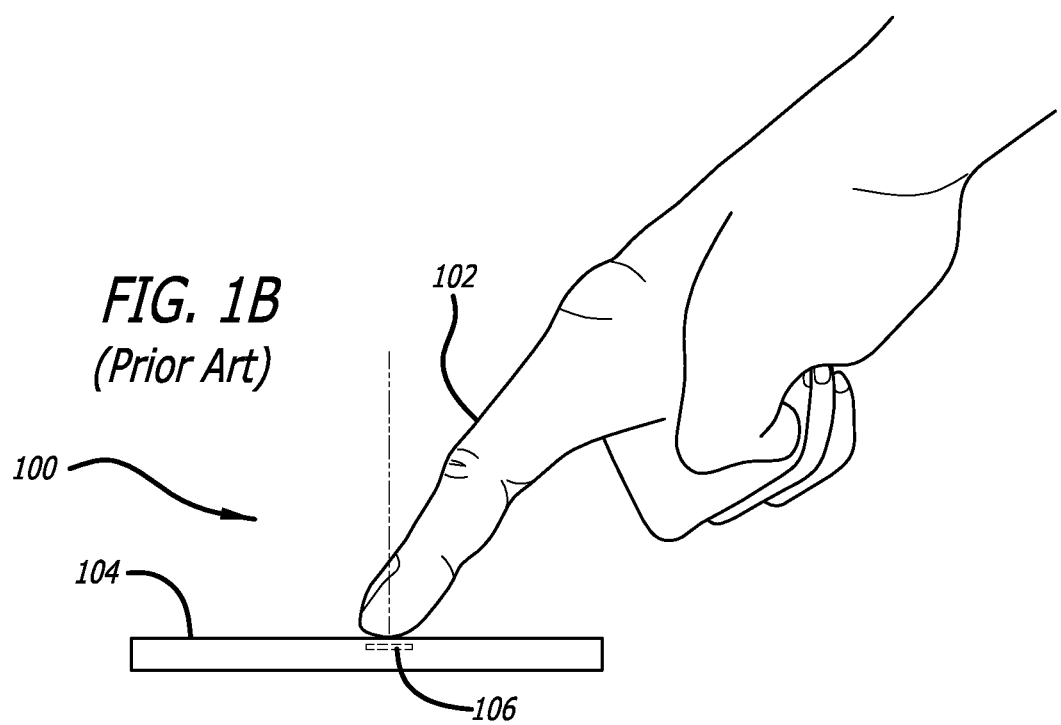

FIGS. 1A and 1B illustrate an example situation 100 wherein a user is accessing content on a computer device 104 through a touch screen, in accordance with an approach used by many conventional devices. In this example, the user accesses content by providing touch input to the touch screen by making a selection with their finger 102. For devices, such as computing device 104, that typically have relatively small touch screens, the limited screen real estate requires many of the elements displayed thereon to be quite small. This can be quite difficult for some users who have relatively thicker fingers. Further, in this example, a pointer 106 is shown displayed underneath the user's finger 102. The pointer 106, in this example, is provided to illustrate that a pointer following the tip of the user's finger 102 would often be obscured, from the point of view of the user. Therefore, it would be desirable to provide an element to facilitate in the navigation and selection of content that is not obscured by the user's finger 102 from the viewpoint of the user.

Figure 2A:
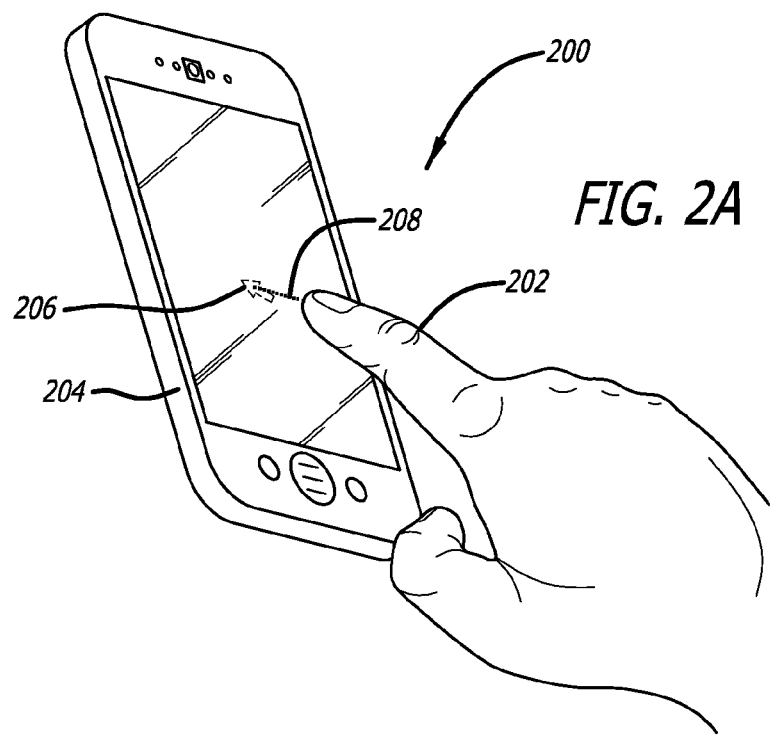
FIGS. 2A and 2B illustrate an example approach for providing input to a computing device in accordance with at least one embodiment.
Figure 2B:
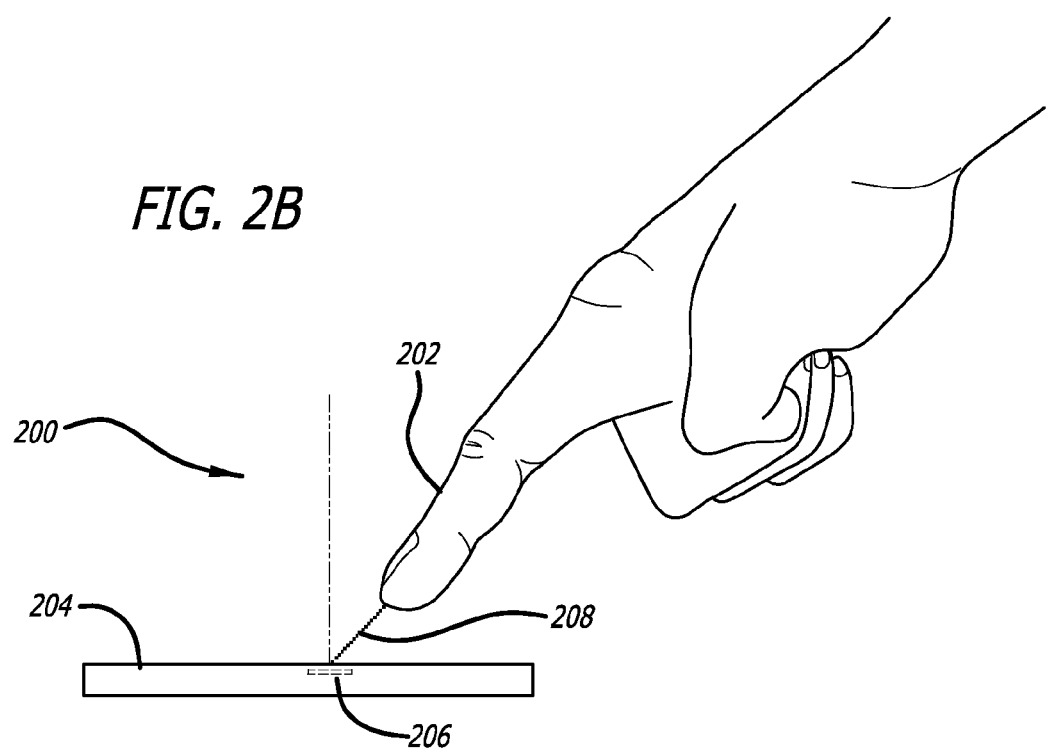

FIGS. 2A and 2B illustrate an example situation 200 wherein a user is accessing content on a computer device 204, in accordance with at least one embodiment. Although a smart phone is shown, it should be understood that various other types of electronic or computing devices that are capable of determining and processing input can be used in accordance with various embodiments discussed herein. These devices can include, for example, tablet computers, notebook computers, desktop computers, personal data assistants, electronic book readers, video gaming consoles or controllers, televisions or smart televisions, and portable media players, among others. In this example, the user is able to navigate through content on the computing device 204 with the aid of a selection element 206 shown displayed a distance 208 offset from the user's finger 202.

In at least one embodiment, the user controls the coordinates or movement of the selection element 206 across the display screen as the user makes lateral movement with their finger 202 a distance 208 above the display screen, as shown in FIG. 2B. In at least one embodiment, approaches discussed herein may utilize a combination of imaging and sensor-based detection approaches in order to detect the presence of the finger 202, or other such object, near the display screen and, further, to determine motion associated therewith. For example, the computing device 204 can have multiple cameras for capturing image information (e.g., still or video) that can be analyzed to determine a relative position of a tip of the user's finger 202 (or an object being held by the user, etc.). The computing device in accordance with various embodiments can also use a field-sensing approach, such as capacitive touch detection, to assist in determining the location and movement of the finger 202 when it is near the device 204, which can include being in the non-imaged zone between the fields of view of cameras on the device, for example. Further, the computing device 204 can include at least one device sensor, in this example an electromagnetic field (EMF) sensor (e.g., an EMF meter or EMF probe), operable to detect changes in an electromagnetic field resulting from a nearby object.

As shown in FIGS. 2A and 2B, the selection element 206 is positioned offset, such as in front of or laterally to the side, from the user's finger 202 to at least prevent the finger 202 from blocking or obscuring the selection element 206 from the user's point of view. In at least one embodiment, the offset of the selection element 206 can be skewed to one side and can change sides depending on a determined viewpoint of the user. For example, a user holding the computing device 204 in their left hand may see the selection element 206 slightly skewed to the left, since the users hand is coming at an angle from the right. Likewise, if the user is holding the computing device 204 in their right hand, they may see the selection element 206 slightly skewed to the right, since the users hand is coming at an angle from the left. Further, the magnitude of the offset may also vary. For example, the magnitude, or distance in front of or to the side of the user's finger 202, may be at a minimum when the user is looking straight at the display screen, such as when the user's gaze direction makes a right angle with the surface of the display. In this example, because of the user's viewpoint, their view of the whole screen is at a maximum. However, as the top of the computing device 204 is tilted away from the user (or to any other desirable direction, such as to the right, left, or toward the user), the angle between the gaze direction and the surface of the display increases, resulting in a decrease in viewable area from the viewpoint of the user. Therefore, items on the display start to appear closer together. As a result, the selection element 206, from user's view, may become obscured, such as being blocked by the user's hand. In order to reduce this likelihood and maximize viewability of the selection element 206, the magnitude of the offset can vary. Therefore, in this example, as the angle between the gaze direction and the surface of the display increases, the magnitude of the offset can also increase to compensate for the potential loss of viewable area and potential blockage from the user's hand. Further, the magnitude of the offset can also be increased if at least one motion sensor of the computing device 204 detects an amount of motion greater than a threshold amount or level. For example, if the user is being driven in a car on a bumpy road, the magnitude of the offset can be increased to improve visibility thereof.

In at least one embodiment, the display screen is a capacitive touch display enabling the user to provide touch inputs and to control the coordinates of the selection element 206 while moving the finger 202 above. For example, if the user wants to launch an application, the user moves the finger 202 in order to move the selection element 206 over the desired application icon and selects the icon by providing a touch input to an area of the touch display screen associated with the icon to launch the application. In at least embodiment, as the user's finger 202 approaches the surface of the display screen, the finger 202 converges with the selection element 206 or converges on the current location of the selection element 206 resulting in the user selecting the desired item. In at least one embodiment, as the user's finger 202 approaches the surface of the display screen and is detected within a threshold distance or within a predetermined range thereof, the selection element 206 becomes locked in place on an object, such as an application, portion of text, URL, phone number, and the like, or fixed in its current location. Such a feature can be provided to ensure selection accuracy because as the finger 202 converges with the selection element 206, the finger will start to obscure the selection element 206. If the finger 202 falls below the threshold distance but the user does not make a touch selection, the selection element will become unfixed and movable once the finger 202 is determined to be above the threshold distance. Alternatively, the selection element 206 could become locked in place upon detecting the user's finger hovering in a substantially fixed location for a predetermined period of time. Thus, a time threshold could also be used to lock the selection element 206 in place.

Figure 4:
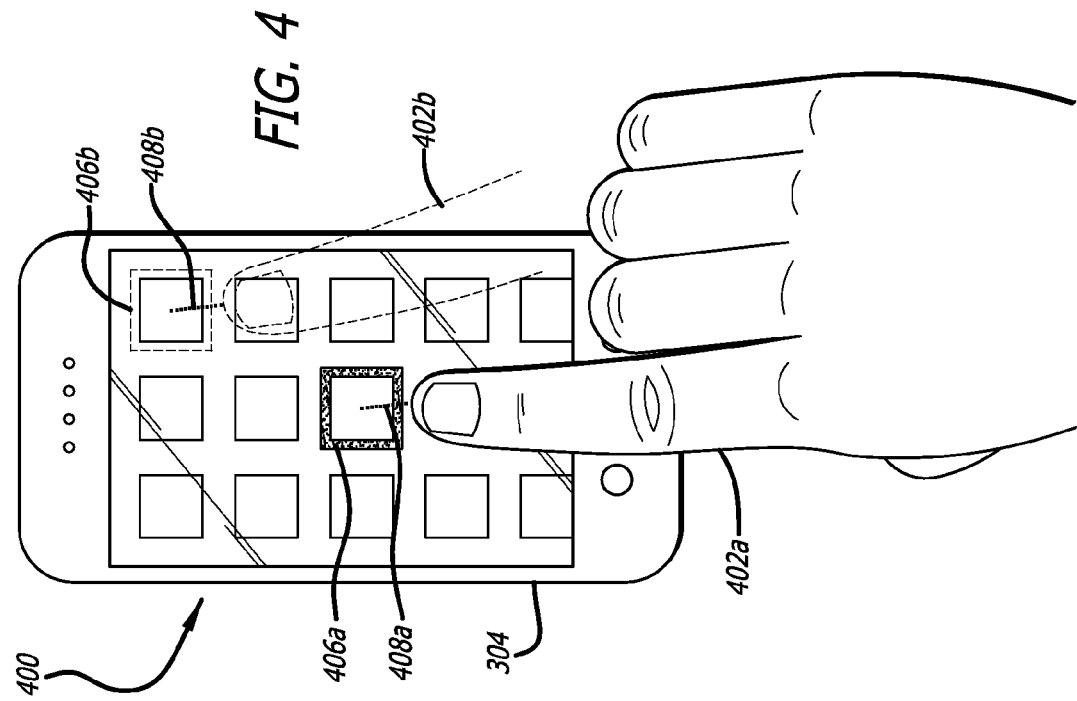
FIG. 4 illustrates another example selection element in accordance with at least one embodiment.
Figure 3:
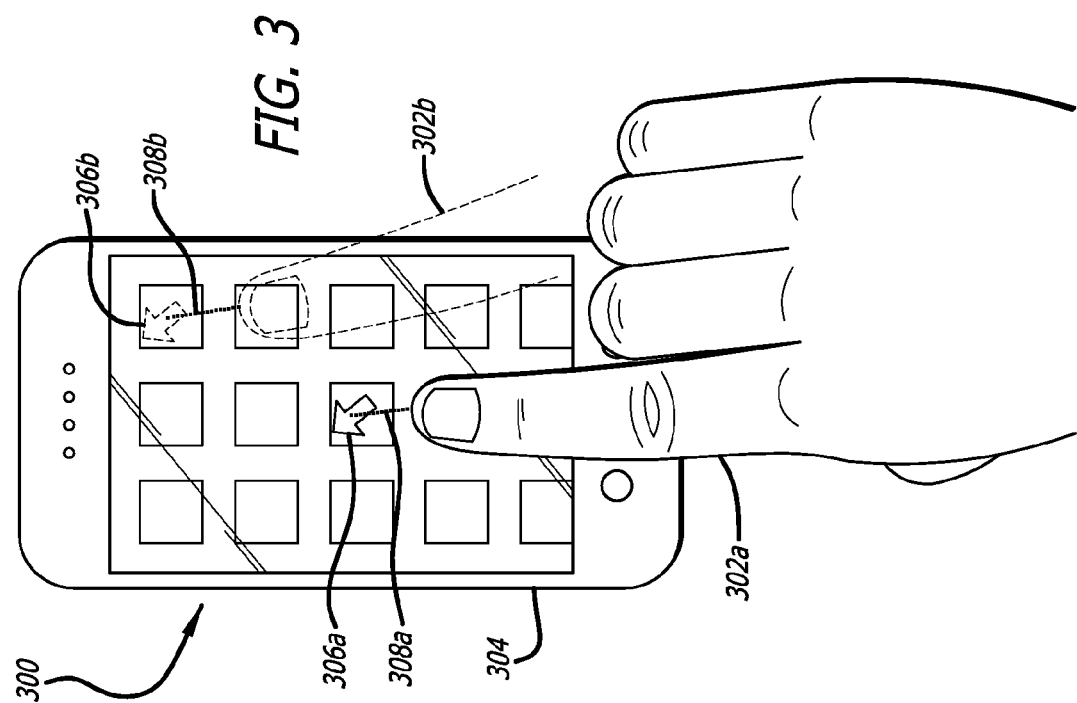
FIG. 3 illustrates an example selection element in accordance with at least one embodiment.

FIG. 3 illustrates an example situation 300 illustrating a user navigating through content on a computer device 304, in accordance with at least one embodiment. In this example, the selection element 306a is a virtual or graphical cursor or pointer, which the user controls with their finger 302a as discussed above. In this example, the user controls movement or the coordinates of the pointer 306a from a first position above an icon at the center of the display screen by holding their finger 302a a distance 308a above the surface of the display to a second position, denoted by a phantom rendering of the finger 302b, distance 308b, and pointer 306b, above an icon in the upper right corner of the display. Similarly, FIG. 4 illustrates an example situation 400 illustrating a user navigating through content on a computer device 404, in accordance with at least one embodiment. In this example, the selection element 406a is not a cursor or pointer, but a highlight or other visual identifier, which the user controls with their finger 402a as discussed above. In this example, the user controls the highlighting or visual change of a graphical item from a first location at the center of the display screen by holding their finger 402a a distance 408a above the surface of the display and offset the selected item to a second location, denoted by a phantom rendering of the finger 402b, distance 408b, and highlighting 406b, of an icon in the upper right corner of the display. Other types of selection elements or selection identifiers are also possible within the scope of the various embodiments.

In at least one embodiment, the selection element is not visible until a finger or other object is detected above the screen. Further, upon detecting a finger or object, an expanded view of the content adjacent the selection element can be rendered for display as the selection element moves across the display screen. For example, the expanded view could appear as a lens, magnifying glass, fisheye zoom view, and the like. The expanded view could be used to facilitate reading the magnified region, or selecting a portion of text from a larger body of text including highlighting, copying, pasting, and deleting text. The selection element could also be used within a text edit field as a cursor or carrot for inputting or editing text and moving the same.

FIG. 5 illustrates an example process 500 for providing a selection element that can be used in accordance with various embodiments. It should be understood that, for any process discussed herein, there can be additional, fewer, or alternative steps performed in similar or alternative orders, or in parallel, within the scope of the various embodiments unless otherwise stated. In this example, content is displayed on a display screen of a computing device 502. In this example, a finger of a user is detected within a predetermined range from a surface of a display screen 504. The user can use their finger to navigate through and select content as discussed elsewhere herein. In response to detecting the finger within the predetermined range, a selection element is positioned offset from the finger 506. The offset positioning keeps the selection element from being obscured by the finger and, thus, enabling it to remain visible to the user. Accordingly, the user can move their finger above the display element to control movement of the selection element across the display screen 508 with lateral movement of the finger within the predetermined range from the surface. As the user's finger approaches the surface of the display screen and is detected within a threshold distance thereof to make a selection, the selection element becomes locked in place or fixed in its current location 510. Such a feature can be provided to ensure selection accuracy because as the finger converges with the selection element, the finger will start to obscure the selection element. When the finger falls below the threshold distance but the user does not make a touch selection, the selection element is caused to become unlocked or unfixed and movable once the finger is determined to be above the threshold distance 512. Various other methods and features can be utilized and provided as well within the scope of the various embodiments.

In at least one embodiment, the user's point of view can be determined by determining a gaze direction of the user. Image information from at least one digital still camera, video camera, infrared sensor, or other such image capture element of the computing device can be used to determine the relative position of at least one feature of a user, such as a user's head or eyes, with respect to the device in order to attempt to determine a relative gaze position or point of view of the user. Further, the computing device can monitor the captured image information in order to attempt to determine motion through changes in position of objects in the background. For example, a rotation or translation of the device can be determined by monitoring changes of the position of background objects captured in images captured at different points in time. Such information can also help to determine the relative position of the user's head during or after the motion, which may not be able to be obtained by relying only on a sensor such as a gyroscope. In at least one embodiment, at least one imaging approach can be utilized with at least one motion determining approach. For example, a video capture and analysis process can be used with an electronic gyroscope and accelerometer-based motion determination approach, or can be used with a background object or light source tracking process. In some embodiments, the computing device can have at least one infrared (IR) emitter and receiver, or transceiver, operable to transmit IR radiation and detect IR reflected back from one or more objects within a field of view of the IR receiver. As known in the art, the human eye reflects IR radiation differently than the rest of the human head, such that the presence and/or position of a user's eyes can quickly be detected and/or located by analyzing a captured IR image. Further, the head position, in some embodiments, could also be determined by a transmitter on the user, such as a transmitter embedded in the user's glasses, ear piece, earring, and the like. Such information can help determine the presence of a user's head without requiring significant image processing, and can also help improve the user's point of view determinations.

FIGS. 6A and 6B illustrate front and back views, respectively, of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
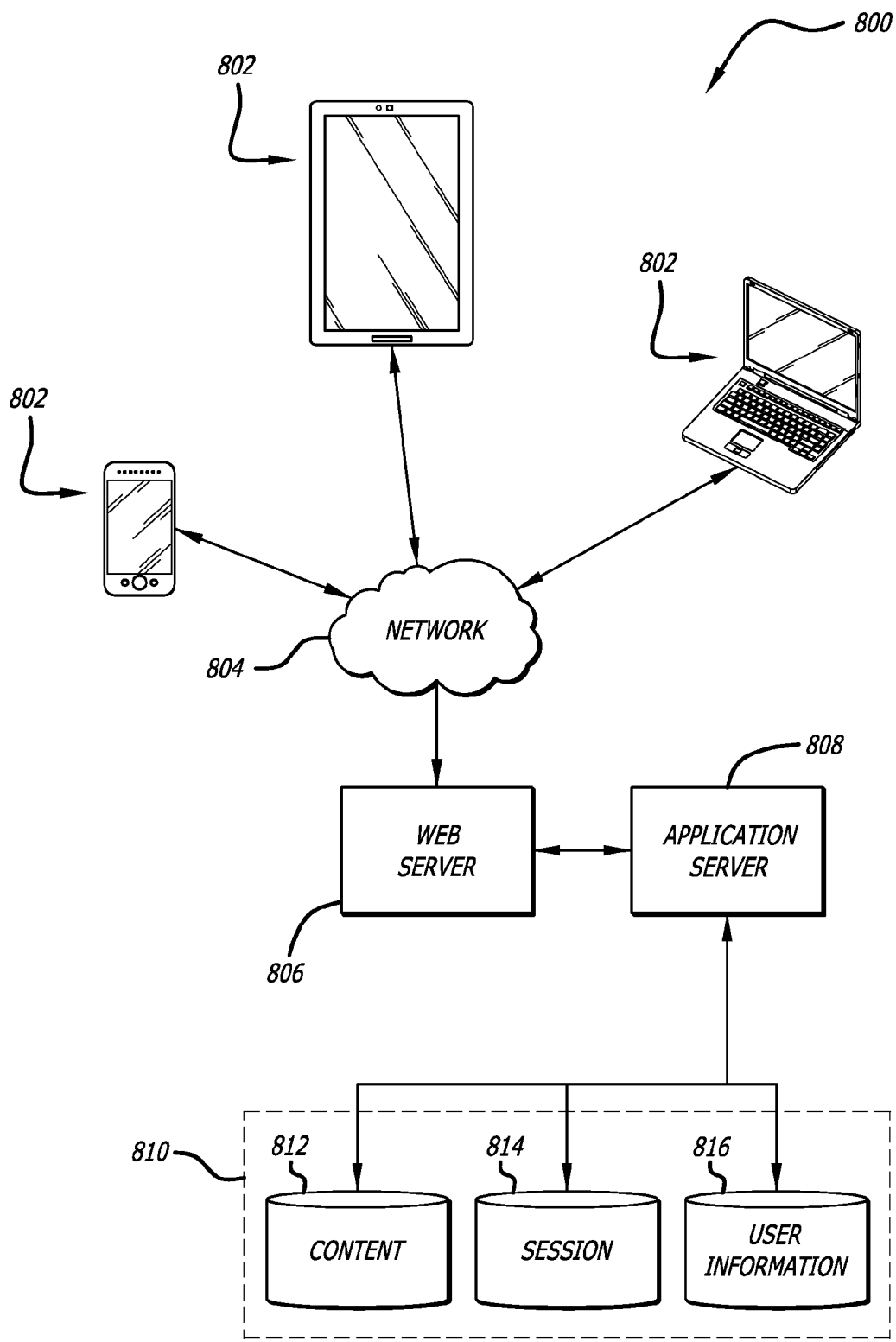
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
under the control of one or more computer systems configured with executable instructions, displaying content on a display screen of a computing device, wherein the display screen is a touch screen;
detecting a location of a finger of a user within a predetermined range from a surface of the display screen;
positioning a selection element displayed on the display screen offset from the finger such that the selection element is visible from a point of view of the user when the finger is at the location;
detecting movement of the finger from the location and within the predetermined range from the display screen;
causing the selection element to move across the display screen based at least in part on the movement of the finger within the predetermined range from the display screen;
detecting the finger approaching the display screen;
prior to the finger touching the display screen, causing the selection element to become fixed to a graphical object on the display screen upon the finger reaching a threshold distance from the surface;
preventing movement of the selection element away from the graphical object to which the selection element is fixed, while the finger remains at or below the threshold distance from the surface;
detecting a touch event by the finger; and
selecting the graphical object to which the selection element is fixed.

2. The computer-implemented method of claim 1, further comprising:
upon detecting the finger above the threshold distance, causing the selection element to become unfixed to the a graphical object on the display screen to enable the movement.

3. The computer-implemented method of claim 1, wherein the selection element converges with the finger as the finger approaches the touch screen to select content.

4. The computer-implemented method of claim 1, further comprising:
capturing one or more images using a camera of the computing device;
analyzing image information obtained from the captured one or more images to determine a current relative position of a feature of the user with respect to the computing device; and
rendering the selection element on the display screen for the point of view based at least in part on the determined current relative position of the feature of the user.

5. The computer-implemented method of claim 4, further comprising:
rendering an expanded view of the content as the selection element moves across the display screen.

6. The computer-implemented method of claim 1, further comprising:
in response to detecting the finger approaching the display screen, causing the offset of the selection element from the finger to reduce.

7. The computer-implemented method of claim 6, further comprising:
capturing one or more images using a camera of the computing device;
analyzing image information captured by the one or more images to determine a current relative position of a feature of the user with respect to the computing device; and rendering the selection element for a point of view consistent with the determined current relative position of the feature of the user.

8. The computer-implemented method of claim 7, further comprising:
monitoring an amount of movement of the computing device using at least one sensor of the computing device; and
analyzing the amount of movement to further determine the current relative position of the feature of the user with respect to the computing device.

9. The computer-implemented method of claim 7, further comprising:
monitoring an amount of movement of the computing device using at least one sensor of the computing device; and
in response to detecting an amount of motion greater than a threshold amount, increasing the offset between the selection element and the finger from the point of view of the user.

10. The computer-implemented method of claim 6, wherein the selection element is at least one of a pointer, a highlight applied to an item of content, or a visual identifier indicating an item of content for selection with respect to the finger of the user.

11. The computer-implemented method of claim 9, further comprising:
rendering an expanded view of the content as the selection element moves across the display screen.

12. A computing device, comprising:
a processor;
a display screen, wherein the display screen is a touch screen; and
memory including instructions that, when executed by the processor, cause the computing device to:
display content on the display screen;
control movement of a selection element across the display screen in response at least in part to movement of a finger a distance from the display screen, the selection element being displayed a distance offset based at least in part on a location of the finger such that the selection element is visible from a point of view of a user when the finger is at the location; detect the location of the finger approaching the display screen;
in response to detecting the finger approaching the display screen, cause the distance offset to reduce;
detect the finger below a threshold distance from the display screen; and
prior to the finger touching the display screen, cause the selection element to become fixed on an object to become selected as the finger makes contact with the display screen.

13. The computing device of claim 12, wherein the instructions, when executed by the processor, further enable the computing device to:
upon detecting the finger above the threshold distance, cause the selection element to become unfixed to the graphical object.

14. The computing device of claim 12, wherein the display screen is a touch screen and the selection element converges with the finger as the finger approaches the touch screen to select content.

15. The computing device of claim 12, wherein the instructions, when executed by the processor, further enable the computing device to:
render an expanded view of the content as the selection element moves across the display screen.

16. A non-transitory computer-readable storage medium storing instructions that, when executed by at least one processor, cause a computing device to:
display content on a display screen, wherein the display screen is a touch screen;
detect a location of a finger of a user within a predetermined range from a surface of the touch screen;
positioning a selection element displayed on the display screen offset from the finger such that the selection element is visible from a point of view of the user when the finger is at the location;
detect movement of the finger from the location and within the predetermined range from the display screen;
cause a selection element to move across the display screen with movement of a finger within the predetermined range from the display screen;
detect the finger within a threshold distance of the display screen;
prior to the finger touching the display screen, cause the selection element to become fixed to a graphical object on the display screen;
prevent movement of the selection element away from the graphical object to which the selection element is fixed, unless the finger moves above the threshold distance from the surface;
detect a touch event by the finger;
select the graphical object to which the selection element is fixed.

17. The non-transitory computer-readable storage medium of claim 16, wherein the instructions that, when executed by the at least one processor of the computing device, further cause
the computing device to:
capture one or more images using a camera of the computing device;
analyze image information obtained from the captured one or more images to determine a current relative position of a feature of the user with respect to the computing device; and
render the selection element for a point view consistent with the determined current relative position of the feature of the user.

18. The non-transitory computer-readable storage medium of claim 17, wherein the instructions that, when executed by the at least one processor of the computing device, further cause the computing device to:
monitor an amount of movement of the computing device using at least one sensor of the computing device; and
analyze the amount of movement to further determine the current relative position of the feature of the user with respect to the computing device.

19. The non-transitory computer-readable storage medium of claim 16, wherein the instructions that, when executed by the at least one processor of the computing device, further cause the computing device to:
monitor an amount of movement of the computing device using at least one sensor of the computing device; and
in response to detecting an amount of motion greater than a threshold amount, increase the offset between the selection element and the finger from a point of view of the user.

20. The non-transitory computer-readable storage medium of claim 16, wherein the instructions that, when executed by the at least one processor of the computing device, further cause the computing device to:
render an expanded view of the content as the selection element moves across the display screen.

* * * * *